United States Patent
Yamaguchi et al.

(10) Patent No.: US 10,634,989 B2
(45) Date of Patent: Apr. 28, 2020

(54) TRANSPARENT SCREEN AND IMAGE DISPLAY SYSTEM

(71) Applicant: Panasonic Intellectual Property Management Co., Ltd., Osaka (JP)

(72) Inventors: Hiroshi Yamaguchi, Osaka (JP); Takashi Yamada, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/305,147

(22) PCT Filed: Apr. 13, 2017

(86) PCT No.: PCT/JP2017/015050
§ 371 (c)(1),
(2) Date: Nov. 28, 2018

(87) PCT Pub. No.: WO2017/221527
PCT Pub. Date: Dec. 28, 2017

(65) Prior Publication Data
US 2019/0332001 A1    Oct. 31, 2019

(30) Foreign Application Priority Data
Jun. 20, 2016   (JP) .................. 2016-121376

(51) Int. Cl.
*G03B 21/62* (2014.01)
*G02B 5/02* (2006.01)
(Continued)

(52) U.S. Cl.
CPC .............. *G03B 21/62* (2013.01); *G02B 5/02* (2013.01); *G03B 21/14* (2013.01); *G03B 21/60* (2013.01); *G03B 21/602* (2013.01); *H04N 5/74* (2013.01)

(58) Field of Classification Search
CPC ...... G03B 21/60; G03B 21/602; G03B 21/62; G03B 21/14; G02B 5/0278; H04N 5/74
(Continued)

(56) References Cited

U.S. PATENT DOCUMENTS

| 5,040,870 A * | 8/1991 | Ohno .................. G02B 1/04 359/443 |
| 6,381,068 B1 * | 4/2002 | Harada ............... G02B 5/0215 359/443 |

(Continued)

FOREIGN PATENT DOCUMENTS

| JP | 2001-242546 | 9/2001 | |
| JP | 2006243691 | * 2/2005 | ............. G03B 21/56 |

(Continued)

OTHER PUBLICATIONS

J.A. Wheatley and W.J. Schrenk., Polymeric Reflective Materials (PRM), Journal of Plastic Film & Sheeting, vol. 10—Jan. 1994, pp. 78-89 (Year: 1994).*

(Continued)

*Primary Examiner* — Clayton E. LaBalle
*Assistant Examiner* — Kevin C Butler
(74) *Attorney, Agent, or Firm* — Wenderoth, Lind & Ponack, L.L.P.

(57) ABSTRACT

A transparent screen is a transparent screen for diffusing image light projected from a projector and displaying an image by transmitting part of incident light rectilinearly and diffusing the other part of the incident light, and includes a base material that is transparent, a diffusion member, and an antireflection layer. The diffusion member is disposed within the base material and diffuses the image light. The antireflection layer is disposed on a projector side of the base material.

10 Claims, 3 Drawing Sheets

(51) Int. Cl.
*G03B 21/14* (2006.01)
*G03B 21/60* (2014.01)
*G03B 21/602* (2014.01)
*H04N 5/74* (2006.01)

(58) Field of Classification Search
USPC ............................................................ 359/452
See application file for complete search history.

(56) References Cited

U.S. PATENT DOCUMENTS

| | | | | |
|---|---|---|---|---|
| 2001/0005282 | A1* | 6/2001 | Etori | G03B 21/62 |
| | | | | 359/453 |
| 2003/0184830 | A1* | 10/2003 | Takada | G02B 5/0252 |
| | | | | 359/15 |
| 2008/0030882 | A1* | 2/2008 | Ichikawa | G03B 21/60 |
| | | | | 359/839 |
| 2009/0207488 | A1* | 8/2009 | Akiyama | G03B 21/60 |
| | | | | 359/455 |
| 2010/0103515 | A1* | 4/2010 | Kang | G03B 21/60 |
| | | | | 359/452 |
| 2010/0128234 | A1* | 5/2010 | Nishikawa | H04N 9/3105 |
| | | | | 353/98 |
| 2015/0362728 | A1* | 12/2015 | Tei | G02B 5/3033 |
| | | | | 353/20 |
| 2017/0205701 | A1* | 7/2017 | Ide | G03B 21/62 |
| 2017/0269360 | A1* | 9/2017 | Yamaguchi | G02B 5/0221 |
| 2018/0180982 | A1* | 6/2018 | Yamaki | G02B 5/02 |
| 2019/0049835 | A1* | 2/2019 | Fujimura | G03B 21/60 |
| 2019/0094432 | A1* | 3/2019 | Yanai | G02B 5/30 |

FOREIGN PATENT DOCUMENTS

| | | | | |
|---|---|---|---|---|
| JP | 2006-119489 | | 5/2006 | |
| JP | 2006-243691 | | 9/2006 | |
| JP | 2006-285096 | | 10/2006 | |
| JP | 2009-192875 | | 8/2009 | |
| JP | 2010-122573 | | 6/2010 | |
| JP | 2011-007995 | | 1/2011 | |
| JP | 2011007995 | * | 1/2011 | ............ G03B 21/60 |
| JP | 5214577 B | | 6/2013 | |
| JP | 2014-071250 | | 4/2014 | |
| JP | 2014-115589 | | 6/2014 | |
| JP | 2017-015824 | | 1/2017 | |
| WO | 2016/203915 | | 12/2016 | |

OTHER PUBLICATIONS

International Search Report of PCT application No. PCT/JP2017/015050 dated Jul. 18, 2017.

* cited by examiner

TRANSPARENT SCREEN AND IMAGE DISPLAY SYSTEM

CROSS-REFERENCE TO RELATED APPLICATIONS

This application is a U.S. national stage application of the PCT International Application No. PCT/JP2017/015050 filed on Apr. 13, 2017, which claims the benefit of foreign priority of Japanese patent application 2016-121376 filed on Jun. 20, 2016, the contents all of which are incorporated herein by reference.

TECHNICAL FIELD

The present disclosure relates to a transparent screen for diffusing image light projected from a projector and displaying an image by transmitting part of incident light rectilinearly and diffusing the other part of the incident light, and an image display system including the transparent screen.

BACKGROUND ART

In recent years, a transparent screen has been proposed that has transparency to transmit background light and causes image light projected from a projector to undergo diffused reflection or diffused transmission to display an image. When this transparent screen is used, for example, it is possible to display a projected image superimposed on a night view in a window of a skyscraper, and to organize a live event or the like as if an image is displayed in the air. In this way, the transparent screen is expected as a key device for implementing new image representation by a projector.

As a transparent screen of a transmission type, a transparent screen of a transmission type including special diffusion microparticles has been proposed (for example, refer to PTL 1). These diffusion microparticles are distributed in a very small amount within the transparent screen of a transmission type. This transparent screen of a transmission type diffuses part of image light greatly and displays an image, and transmits background light rectilinearly.

Part of the diffused light is reflected by an interface between a back surface of the transparent screen and the air. Therefore, the transparent screen of a transmission type having the above-described configuration can be used as a transparent screen of a reflection type.

Furthermore, as the transparent screen of a reflection type, the following transparent screen of a reflection type has been proposed. One example of the transparent screen of a reflection type includes a plurality of protrusions, a selective reflection layer provided in the plurality of protrusions, and a transparent material covering a front surface of the selective reflection layer. The selective reflection layer selectively reflects right-handed circularly polarized or left-handed circularly polarized laser light having a specified wavelength (refer to PTL 2). Another example of the transparent screen of a reflection type has a light-reflecting region partially provided in a transparent base material (refer to PTL 3).

An observer can enjoy an image while observing background by using such a transparent screen of a transmission type or reflection type.

CITATION LIST

Patent Literature

PTL 1: Japanese Patent No. 5214577
PTL 2: Unexamined Japanese Patent Publication No. 2014-71250
PTL 3: Unexamined Japanese Patent Publication No. 2006-119489

SUMMARY OF THE INVENTION

The present disclosure provides a transparent screen that can inhibit generation of unnecessary images, and an image display system.

The transparent screen according to the present disclosure is a transparent screen for diffusing image light projected from a projector and displaying an image by transmitting part of incident light rectilinearly and diffusing the other part of the incident light, and includes a base material that is transparent, a diffusion member, and an antireflection layer. The diffusion member is disposed within the base material and diffuses image light. The antireflection layer is disposed on a projector side of the base material.

According to the present disclosure, generation of unnecessary images can be inhibited. This allows an observer to observe an image without being aware that the image displayed on the transparent screen is a projected image.

Figure 1:
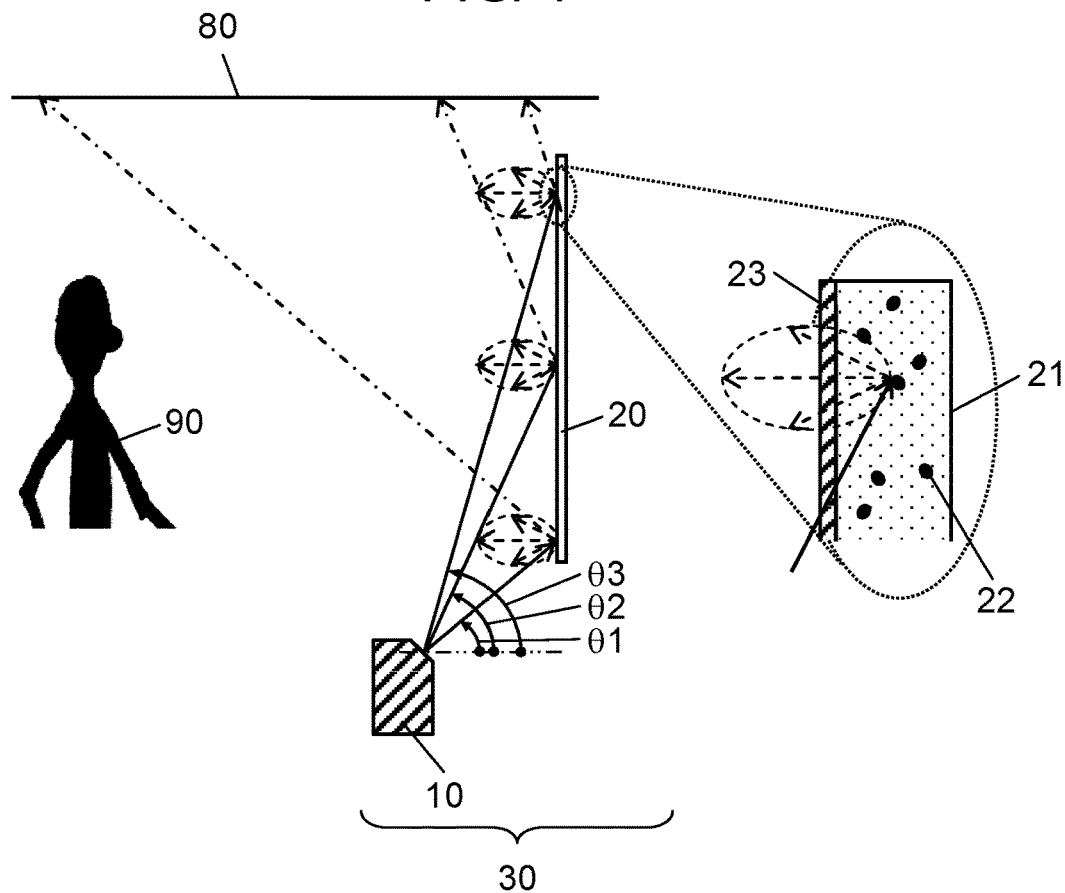
FIG. 1 is a schematic diagram of an image display system according to a first exemplary embodiment.

DESCRIPTION OF EMBODIMENT (Circumstances that have LED to the Present Disclosure)

Conventionally, in order for a transparent screen to transmit background light, at least part of incident light into the transparent screen needs to be transmitted through the transparent screen rectilinearly. Priority is usually given to transparency for applications of the transparent screen in many cases. When priority is given to transparency, the transparent screen transmits 50% to 80% of incident light rectilinearly. If there is unevenness on a surface of the transparent screen, which is an interface between the transparent screen and the air, light will be diffused and will not be transmitted through the transparent screen rectilinearly. Therefore, in order for light to be transmitted through the transparent screen rectilinearly, the surface of the transparent screen needs to be smooth.

Therefore, even when an element of diffused transmission or diffused reflection is on the surface of the transparent screen, 50% or more of the surface of the transparent screen needs to be smooth. Meanwhile, when the element of diffusion is within the transparent screen, the entire surface of the transparent screen is generally smooth.

Then, the incident light into the smooth surface is specularly reflected on the surface. Since image light projected from a projector has locally high directivity, the specularly reflected light of the image light has high luminance. Therefore, if an observer who observes an image directly observes the specularly reflected light, the observer is dazzled and cannot observe the image. Therefore, in order to prevent the specularly reflected light from going to an assumed observation range, it is preferable to project image light at a wide angle downward from a ceiling or upward from a footing.

However, when the image light is projected downward from the ceiling, an unnecessary image by specular reflection is generated in the footing near the transparent screen. Meanwhile, when the image light is projected upward from the footing, an unnecessary image by specular reflection is generated on the ceiling near the transparent screen. The unnecessary image generated in the ceiling or footing is offensive to the observer. Furthermore, by recognizing the unnecessary image, the observer will be aware that an image displayed on the transparent screen is an image projected from the projector.

The present disclosure provides a screen that can inhibit generation of unnecessary images, and an image display system. This allows an observer to observe an image without being aware that the image displayed on the screen is a projected image.

An exemplary embodiment will be described below with reference to the drawings. However, an unnecessarily detailed description will be omitted in some cases. For example, a detailed description of a well-known matter and a duplicated description of substantially identical configuration will be omitted in some cases. This is to avoid unnecessary redundancy in the following description and to facilitate understanding by those skilled in the art.

Note that the accompanying drawings and the following description are provided to enable those skilled in the art to fully understand the present disclosure, and are not intended to limit the subject of the present disclosure.

First Exemplary Embodiment

FIG. 1 is a schematic diagram of image display system 30 according to a first exemplary embodiment.

Image display system 30 includes projector 10 projecting image light and screen 20.

Projector 10 is a super short focal length projector and is disposed on a front footing of screen 20. If observer 90 who observes images directly observes specularly reflected light on a surface of screen 20, observer 90 feels dazzling. That is, the specularly reflected light obstructs image observation and background observation. Therefore, projector 10 projects image light on screen 20 at a large angle. Furthermore, free space near screen 20 can be effectively used by using the super short focal length projector. In the present disclosure, the background is a landscape on an opposite side of screen 20 from observer 90. That is, observer 90 observes the background through screen 20.

The background light is light reaching observer 90 from a background side through screen 20.

An incidence angle of the image light projected on screen 20 from projector 10 is set as follows. Here, the incidence angle of the image light is an angle between an incident direction of the image light and a normal direction to screen 20. An incidence angle θ1 to a lower end of screen 20 is set at 27 degrees, an incidence angle θ2 to a center of screen 20 is set at 52 degrees, and an incidence angle θ3 to an upper end of screen 20 is set at 64 degrees. That is, projector 10 is disposed such that a maximum incidence angle of the image light to screen 20 is between 60 degrees and 75 degrees inclusive.

Screen 20 is a screen for causing the image light projected from projector 10 to undergo diffused reflection and displaying an image by transmitting part of incident light rectilinearly and diffusing the other part of the incident light. That is, screen 20 is a transparent screen of a reflection type. Screen 20 includes base material 21 that is transparent, diffusion microparticles 22 (one example of diffusion member), and antireflection film 23 (antireflection layer). Both principal planes of base material 21 are smooth. Diffusion microparticles 22 are added within base material 21. Diffusion microparticles 22 perform diffused reflection of about 10% of the incident light. Screen 20 transmits remaining about 90% of the incident light. Diffusion microparticles 22 are uniformly distributed within base material 21. Therefore, the image light undergoes diffused reflection by screen 20, and can be observed as an image.

Both principal planes of screen 20 are also smooth. Therefore, light transmitted through screen 20 travels rectilinearly, without being diffused in a thickness direction of screen 20. Therefore, observer 90 can observe the background clearly.

Antireflection film 23 is provided on the principal plane of base material 21 on an incident side of the image light projected from projector 10. That is, antireflection film 23 is disposed on a projector 10 side of base material 21. Antireflection film 23 may be directly disposed on the principal plane on the projector 10 side of base material 21. Alternatively, antireflection film 23 may be disposed on the principal plane on the projector 10 side of base material 21 via a transparent adhesive layer (not illustrated). In this case, it is preferable that a refractive index of the transparent adhesive layer be substantially identical to a refractive index of base material 21.

Antireflection film 23 is, for example, dielectric multilayer films including five layers to nine layers of a high-refractive index layer and a low-refractive index layer laminated alternately. A material for the high-refractive index layer is, for example, a transparent dielectric substance such as $TiO_2$ and $Ta_2O_5$. A refractive index of the high-refractive index layer is, for example, greater than or equal to 2.0. A material for the low-refractive index layer is, for example, a transparent dielectric substance such as $SiO_2$ and $MgF_2$. A refractive index of the low-refractive index layer is, for example, less than or equal to 1.5. In addition, thicknesses of the high-refractive index layer and the low-refractive index layer are set depending on a wavelength band and an incidence angle at which a reflectance is reduced. That is, the reflectance of antireflection film 23 is set by changing the thicknesses of the high-refractive index layer and the low-refractive index layer.

The incident light entering antireflection film 23 is reflected by interfaces of the dielectric multilayer films including air interfaces. These reflected light beams interfere with each other and cancel each other. Accordingly, antireflection film 23 reduces the reflected light beams.

Next, generation of an unnecessary image by specular reflection of a screen without antireflection film 23 will be described.

As shown in FIG. 1, image light (arrow of solid line) projected from projector 10 is specularly reflected by the surface of screen 20. The specularly reflected light (arrow of alternate long and short dash line) is reflected at a reflection angle corresponding to the incidence angle, and goes to ceiling 80. The reflection angle of the specularly reflected light on a lower side of screen 20 (corresponding to the incidence angles θ1 to θ2) is small. In addition, a distance of the specularly reflected light on the lower side of screen 20 to reach ceiling 80 is long. That is, since the specularly reflected light on the lower side of screen 20 spreads, sharpness and luminance of the image decrease. Therefore, observer 90 is not worried about the unnecessary image by specular reflection. The distance of the specularly reflected light on a left end and right end of screen 20 to reach ceiling 80 is also long. That is, since sharpness and luminance of the image decrease, observer 90 is not worried about the unnecessary image by specular reflection.

However, the specularly reflected light on an upper side from a center of screen 20 is reflected toward ceiling 80 right above screen 20. Furthermore, since a focal depth of projector 10 is deep, the specularly reflected light reflected toward ceiling 80 right above screen 20 is in focus. Therefore, when antireflection film 23 is not used as in conventional techniques, an unnecessary image will be displayed on ceiling 80 near the screen. Observer 90 feels this unnecessary image offensive while enjoying an image on the screen.

In addition, as the incidence angle θ of the image light increases, a minute area dSr of the reflected image generated on ceiling 80 corresponding to a minute area dSs of the image projected on screen 20 decreases. Here, dSr/dSs is in inverse proportion to the third power of tan (θ). Therefore, when image illuminance is uniform and a mirror reflectance of screen 20 is uniform, the specularly reflected light is concentrated on a small area on ceiling 80 as the incidence angle θ increases. That is, on ceiling 80 corresponding to near the upper end of screen 20, light flux of the specularly reflected light is concentrated on a small area. Therefore, illuminance of the specularly reflected image corresponding to the upper end of screen 20 increases. Furthermore, as will be describes later, the reflectance of screen 20 increases as the incidence angle θ to screen 20 increases. Therefore, illuminance of the specularly reflected image corresponding to the upper end of screen 20 further increases.

Figure 2:
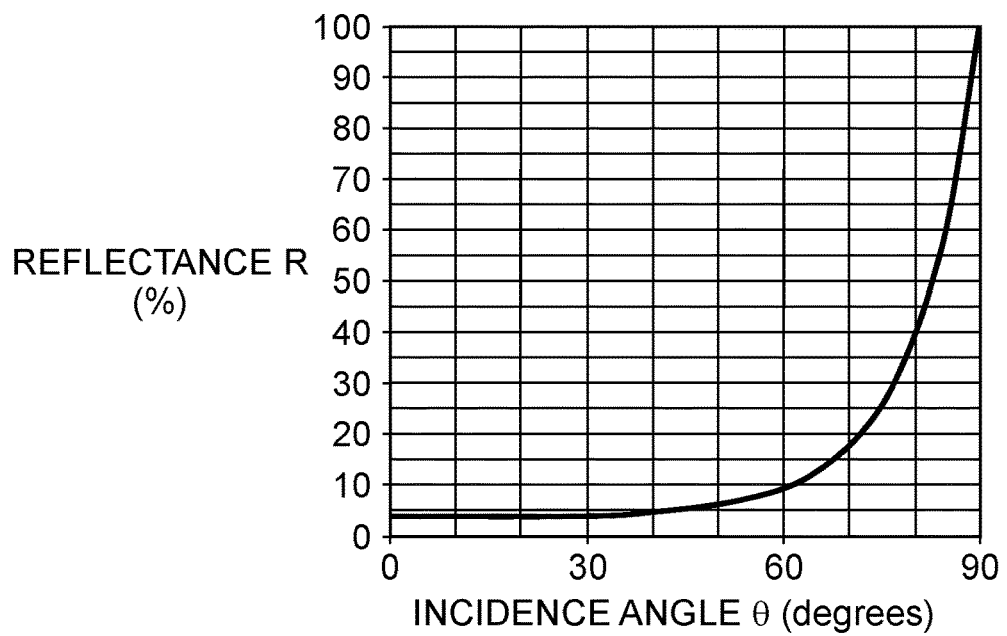
FIG. 2 is a diagram showing a relationship between an incidence angle and a reflectance of projected image light on a screen.

FIG. 2 is a diagram showing a relationship between the incidence angle θ of the projected image light and the reflectance R on screen 20. FIG. 2 is a diagram specifically showing the relationship between the incidence angle θ and the reflectance R of light entering a transparent material (refractive index 1.5) from the air (refractive index 1.0).

As shown in FIG. 2, the reflectance R increases rapidly when the incidence angle θ exceeds 50 degrees. When screen 20 does not include antireflection film 23, the reflectance R of each region of screen 20 is as follows. The reflectance R from the lower end of screen 20 (incidence angle θ1=27 degrees) to near the center of screen 20 (incidence angle θ2=52 degrees) is less than or equal to 6%. Meanwhile, the reflectance R near the upper end of screen 20 (incidence angle θ3=64 degrees) is 12%.

In this way, the reflected image by specular reflection near the upper end of screen 20 easily enters a visual field of observer 90 and has high illuminance near right above screen 20. Therefore, the reflected image by specular reflection near the upper end of screen 20 becomes offensive to observer 90.

Screen 20 shown in FIG. 1 includes antireflection film 23 on an incidence surface. Therefore, screen 20 reduces intensity of the reflected light and inhibits generation of the unnecessary reflected image on ceiling 80.

Particularly, as described above, it is the reflectance near the upper end of screen 20 that greatly contributes to generation of the unnecessary image. Therefore, antireflection film 23 is designed to minimize the reflectance in a visible range near the incidence angle θ3 in the upper end of screen 20. That is, the reflectance of antireflection layer 23 when the image light enters screen 20 at the incidence angle between 60 degrees and 75 degrees inclusive is smaller than the reflectance of antireflection layer 23 when the image light enters screen 20 at the incidence angle of 0 degrees.

Antireflection film 23 reduces the reflectance near the incidence angle in the upper end of screen 20 most significantly. Therefore, antireflection film 23 is set to reduce the reflectance of the image light of 64-degree incidence angle most significantly. A thickness of antireflection film 23 is designed in accordance with the incidence angle (θ3=64 degrees) at which the reflectance is reduced most significantly.

With the above-described configuration, image display system 30 according to the first exemplary embodiment can inhibit generation of unnecessary images by specular reflection of screen 20 while implementing display of images and transmission of background light with screen 20 having a smooth surface. This allows observer 90 to observe an image without being aware that the image displayed on screen 20 is a projected image.

Note that in the present exemplary embodiment, projector 10 is a super short focal length projector. When the super short focal length projector is used, the incidence angle to the upper end of screen 20, which is the maximum incidence angle to screen 20, is often set at between 60 degrees and 75 degrees inclusive. Therefore, image display system 30 that can inhibit generation of unnecessary reflected images is implemented by combining screen 20 designed to reduce the reflectance of the image light of the incidence angle of a range from 60 degrees to 75 degrees inclusive most significantly and the super short focal length projector.

Note that in the present exemplary embodiment, antireflection film 23 reduces the reflectance of the image light of the incidence angle between 60 degrees and 75 degrees inclusive most significantly, but the present disclosure is not limited to this case. The reflectance of a partial region of antireflection film 23 may be smallest at an incidence angle of the image light entering the partial region. At this time, a thickness of each partial region of antireflection film 23 is set in accordance with the incidence angle to each partial region in which the reflectance is reduced most significantly. Here, the partial region of antireflection film 23 is, for example, one partial region obtained by splitting the principal plane of antireflection film 23 in five in each of a vertical direction and a horizontal direction. The incidence angle of the image light entering the partial region of antireflection film 23 means an incidence angle of the image light entering a center of the partial region.

Note that in the present exemplary embodiment, the reflectance of antireflection film 23 at the incidence angle θ3 may be smaller than the reflectance of antireflection film 23 at the incidence angle θ2. That is, the reflectance of antireflection film 23 at the incidence angle of the image light entering the partial region of antireflection film 23 on a far side from projector 10 may be smaller than the reflectance of antireflection film 23 at the incidence angle of the image light entering a center of projector 10.

Figure 3:
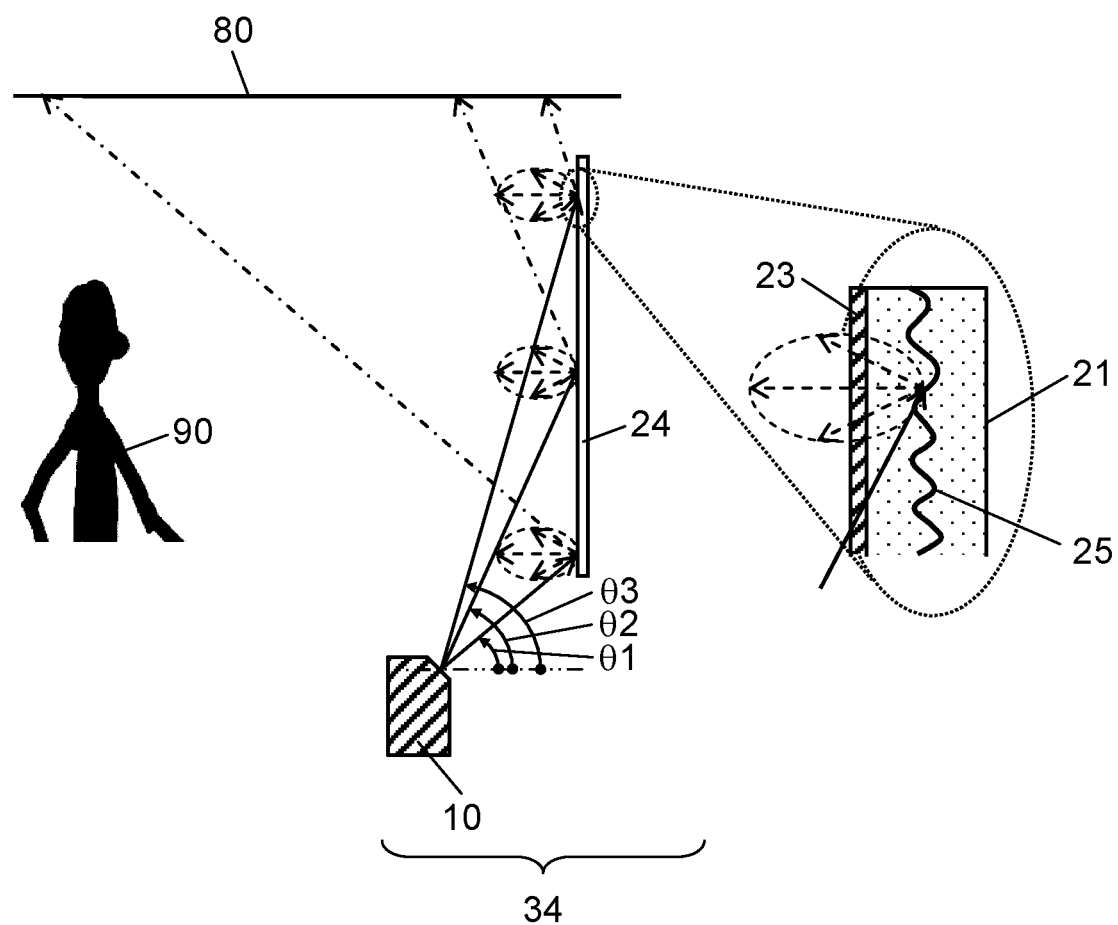
FIG. 3 is a schematic diagram of another image display system according to the first exemplary embodiment.

In the present exemplary embodiment, screen 20 includes diffusion microparticles 22 disposed within base material 21, but the present disclosure is not limited to this case. FIG. 3 shows image display system 34 of a modification. Image display system 34 includes screen 24 instead of screen 20. Screen 24 includes mirror layer 25 (another example of diffusion member) disposed within base material 21, mirror layer 25 having a fine uneven shape. Mirror layer 25 is, for example, a half mirror that reflects about 10% of incident light and transmits remaining about 90% of the incident light. Mirror layer 25 is formed to have the fine uneven shape. Therefore, image light undergoes diffused reflection by screen 24 macroscopically, and can be observed as an image.

Meanwhile, the screen of a reflection type that does not transmit background light displays a bright vivid image by causing projected image light to undergo diffused reflection efficiently. Therefore, the antireflection film is not provided on a surface of the screen of a reflection type.

Figure 4:
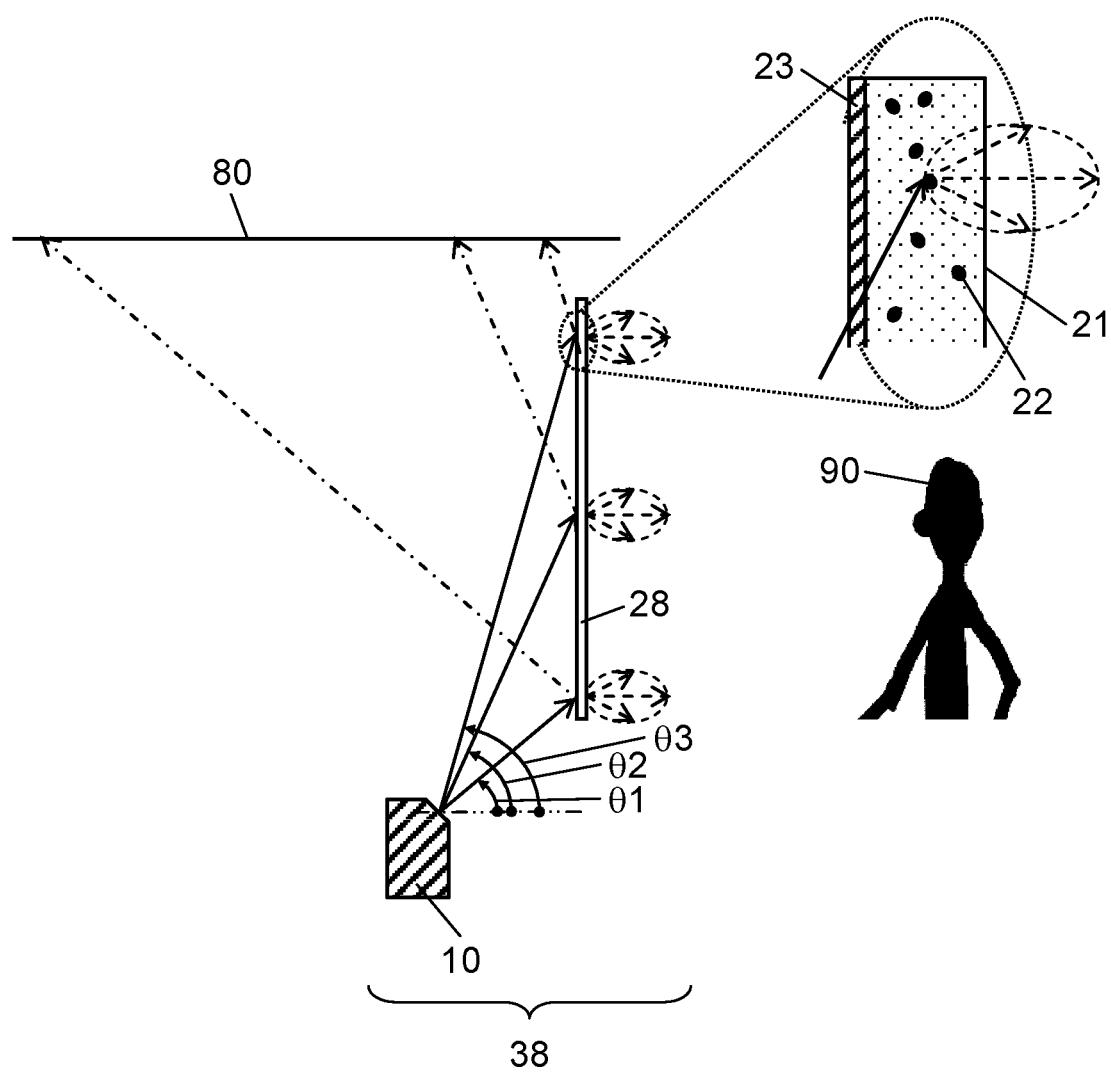
FIG. 4 is a schematic diagram of still another image display system according to the first exemplary embodiment.

Note that in the present exemplary embodiment, image display system 30 includes screen 20 of a diffused reflection type, but the present disclosure is not limited to this case. As shown in FIG. 4, image display system 38 of a modification may include screen 28 of a diffused transmission type. In this case, screen 28 causes image light projected from projector 10 to undergo diffused transmission to display an image. In order for screen 28 to transmit background light, a surface of screen 28 is smooth. Therefore, as in image display system 30 of a reflection type, the image light is specularly reflected by the surface of screen 28. Therefore, as shown in FIG. 4, by disposing antireflection film 23 on the surface on an incidence plane side of screen 28, generation of unnecessary images on ceiling 80 can be inhibited.

Note that in the present exemplary embodiment, antireflection film 23 is a dielectric multilayer film, but the present disclosure is not limited to this case. Antireflection film 23 may be, for example, a minute structure called moth eye or sub-wavelength structure (SWS) provided on the surface of base material 21, the minute structure being less than or equal to a wavelength of light.

Note that in the present exemplary embodiment, projector 10 is a super short focal length projector, but the present disclosure is not limited to this case. Projector 10 may be a projector other than the super short focal length projector. Even in this case, when projector 10 is disposed such that the maximum incidence angle is between 60 degrees and 75 degrees inclusive, effects similar to effects when the super short focal length projector is used are obtained.

INDUSTRIAL APPLICABILITY

A screen according to the present disclosure can inhibit generation of unnecessary images caused by specular reflection, while implementing transmission of background light. Therefore, the screen according to the present disclosure is useful as a screen that causes image light projected from a projector to undergo diffused reflection or diffused transmission to display an image, the screen also transmitting background light.

REFERENCE MARKS IN THE DRAWINGS

10: projector
20, 24, 28: screen (transparent screen)
21: base material
22: diffusion microparticles (diffusion member)
23: antireflection film (antireflection layer)
25: mirror layer (diffusion member)
30, 34, 38: image display system
80: ceiling
90: observer

The invention claimed is:

1. A transparent screen for diffusing image light projected from a projector and displaying an image, the transparent screen configured to transmit and diffuse incident light, the transparent screen comprising:
a base part including a diffuser which diffuses the image light; and
an antireflection layer disposed on a side of the projector of the base part,
wherein a reflectance of the antireflection layer when the image light enters at an incidence angle between 60 degrees and 75 degrees inclusive is smaller than a reflectance of the antireflection layer when the image light enters at an incidence angle of 0 degrees.

2. The transparent screen according to claim 1, wherein a reflectance of a partial region of the antireflection layer is smallest at an incidence angle of the image light entering the partial region.

3. The transparent screen according to claim 1, wherein the antireflection layer is a dielectric multilayer film including a high-refractive index layer and a low-refractive index layer laminated alternately.

4. The transparent screen according to claim 3, wherein a reflectance of the antireflection layer is set by changing thicknesses of the high-refractive index layer and the low-refractive index layer.

5. An image display system comprising:
a projector configured to project image light; and
a transparent screen configured to diffuse the image light and display an image, and configured to transmit and diffuse incident light,
the transparent screen including:
a base part including a diffuser which diffuses the image light; and
an antireflection layer disposed on a side of the projector of the base part,
wherein a reflectance of the antireflection layer when the image light enters the transparent screen at a maximum incidence angle of the image light is smaller than a reflectance of the antireflection layer when the image light enters at an incidence angle of 0 degrees.

6. The image display system according to claim 5, wherein the projector is disposed to make the maximum incidence angle of the image light to the transparent screen between 60 degrees and 75 degrees inclusive.

7. The image display system according to claim 5, wherein a reflectance of a partial region of the antireflection layer is smallest at an incidence angle of the image light entering the partial region.

8. The image display system according to claim 5, wherein the antireflection layer is a dielectric multilayer film including a high-refractive index layer and a low-refractive index layer laminated alternately.

9. The image display system according to claim 8, wherein a reflectance of the antireflection layer is set by changing thicknesses of the high-refractive index layer and the low-refractive index layer.

10. An image display system comprising:
a projector configured to project image light; and
a transparent screen configured to diffuse the image light and display an image, and configured to transmit and diffuse incident light,
the transparent screen including:
a base part including a diffuser which diffuses the image light; and
an antireflection layer disposed on a side of the projector of the base part,
wherein a reflectance of the antireflection layer at an incidence angle of the image light entering a partial region of the antireflection layer on a far side from the projector is smaller than a reflectance of the antireflection layer at an incidence angle of the image light entering a center of the projector.

\* \* \* \* \*